US012203595B2

(12) United States Patent
Bucciarelli et al.

(10) Patent No.: US 12,203,595 B2
(45) Date of Patent: Jan. 21, 2025

(54) ROTARY MANIFOLD AND METHOD OF USE

(71) Applicants: Adrian Bucciarelli, Buenos Aires (AR); Jason Pitcher, The Woodlands, TX (US)

(72) Inventors: Adrian Bucciarelli, Buenos Aires (AR); Jason Pitcher, The Woodlands, TX (US)

(73) Assignee: Batfer Investment S.A., Montevideo (UY)

( * ) Notice: Subject to any disclaimer, the term of this patent is extended or adjusted under 35 U.S.C. 154(b) by 769 days.

(21) Appl. No.: 17/198,202

(22) Filed: Mar. 10, 2021

(65) Prior Publication Data

US 2021/0199243 A1    Jul. 1, 2021

Related U.S. Application Data

(63) Continuation-in-part of application No. 16/792,449, filed on Feb. 17, 2020.

(51) Int. Cl.
*F16N 29/02*     (2006.01)
*F16N 7/38*      (2006.01)

(52) U.S. Cl.
CPC .............. *F16N 29/02* (2013.01); *F16N 7/38* (2013.01); *F16N 2210/26* (2013.01); *F16N 2230/22* (2013.01); *F16N 2250/04* (2013.01); *F16N 2270/30* (2013.01)

(58) Field of Classification Search
CPC ........ F16N 29/02; F16N 7/38; F16N 2210/26; B65B 3/12

USPC .................. 137/625.15, 616.7, 625
See application file for complete search history.

(56) References Cited

U.S. PATENT DOCUMENTS

| 4,253,380 | A  | * | 3/1981  | McConnell ........... F01B 3/0058 |
| | | | | 91/503 |
| 7,059,349 | B2 | * | 6/2006  | Breda ................. F16K 11/0856 |
| | | | | 137/625.11 |
| 11,157,025 | B2 | * | 10/2021 | Shampine ............... F04F 13/00 |
| 11,320,079 | B2 | * | 5/2022  | Kuhn De Chizelle . F16L 41/03 |
| 2006/0230690 | A1 | * | 10/2006 | Dunick ................. E04B 1/3465 |
| | | | | 52/64 |
| 2015/0016934 | A1 | * | 1/2015  | Cooper ................. E02F 3/3677 |
| | | | | 414/735 |
| 2015/0345272 | A1 | * | 12/2015 | Kajaria ................. E21B 34/025 |
| | | | | 166/308.1 |
| 2018/0346306 | A1 | * | 12/2018 | Carpino ................ F16K 11/085 |
| 2019/0263603 | A1 | * | 8/2019  | Saylor ..................... B65B 35/04 |
| 2019/0278306 | A1 | * | 9/2019  | Shampine ............... F04F 13/00 |
| 2020/0003363 | A1 | * | 1/2020  | Köppel ................. F16K 31/535 |
| 2021/0300692 | A1 | * | 9/2021  | Harmon ................. A01C 7/081 |
| 2023/0243466 | A1 | * | 8/2023  | Howson .................. E02F 9/265 |
| | | | | 184/6.4 |

* cited by examiner

*Primary Examiner* — Michael R Mansen
*Assistant Examiner* — Mark K Buse
(74) *Attorney, Agent, or Firm* — Werner IP Law, P.C.

(57) ABSTRACT

An automated lubrication system for large industrial use delivering high pressure lubrication from a pumping unit to a manifold for disbursement in metered quantities for maintenance operations synchronized through logic control to regular operations of equipment to prevent or minimize interference.

12 Claims, 6 Drawing Sheets

ROTARY MANIFOLD AND METHOD OF USE

CROSS-REFERENCE TO RELATED APPLICATIONS

This application is a continuation-in-part of co-pending U.S. Utility patent application Ser. No. 16/792,449, by Jason Pitcher, titled "Method and Apparatus for Monitoring and On-demand Lubricating of Industrial Valves" filed 17 Feb. 2020, and incorporated herein by reference for all purposes.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

FIELD OF THE INVENTION

The invention relates generally to valves for control of fluid flow. More particularly, the invention relates to manifold or zipper devices and the control or utilization thereof in large scale industrial operations.

BACKGROUND OF THE INVENTION

Many industrial operations are dependent on the ability to control fluid flow. Valves are commonly used to control flow through pipes and hoses as well as in/out of equipment, vessels, etc. A manifold (also call a zippers) is a collection of multiple valves combined to a single functioning unit, sometimes having a single valve body or chamber. A manifold is used to connect and control fluid flow along multiple lines as part of a fluid control system.

Because of the diversity of fluid control systems utilized in different environments, and the fluid characteristics to be manipulated by valves and manifolds, including but not limited to flow path, velocity, pressure, viscosity, abrasive effects, systems must operate; there is a vast assortment of configurations applicable to the innovation presented. Choices for specific applications can be further influenced by past industry experience and knowledge, which is often collected and shared in what is commonly referred to as "best practices." Consensus between industry members to implement a subset of the "best practices" establishes an industry standard, compliance with which is often voluntarily rather than regulatory in field implementation.

The American Petroleum Institute ("API"), American Society of Mechanical Engineers ("ASME"), and NSF International ("NSF"), formerly the "National Sanitation Foundation," are some of the organizations maintaining standards for valve and piping specifications. Because specifications often depend on industry member consensus and voluntary compliance, the duties and obligations required to comply are often minimalized as much as tolerable to society. This can lead to eventual codification of the standards by regulatory agencies, resulting in mandatory compliance requirements with enforcement by civil and/or criminal penalties depending on damages for breaches leading to safety incidents and/or environmental impact.

There currently exist centralized lubrication systems, however they operate primarily on bushings, rollers, etc. and deliver quantities of lubricant on demand, or at regularly timed intervals. Most are powered cooperatively with the application device so timing is coordinated with actual operation, not the continuing passage of time. An example is found in farm machinery where centralized lubrication systems may be configured to deliver measured lubricant to bearings and fittings based on the hours the machinery operates rather than the distance, or continuing calendar time.

A tractor may contain a centralized lubrication system that only tracts time when the tractor is running. This means the lubrication will not be applied when the tractor is sitting idle for several weeks. However, when planting or harvest demands essentially round-the-clock operations the centralized lubrication system delivers as required to keep the tractor properly maintained.

For simplicity in explanation and understanding of the innovations and their utilizations presented by the specification, references herein will be to API specifications for fluids in the oil and gas industry ("O&G"). Examples presented are focused on exploration and production processes in O&G but are also applicable to other industries. Any exclusions should not be construed as non-applicable, unless specifically designated as such.

The API 6A specification is the international standard for valves specific to wellhead and Christmas tree equipment used in the petroleum and natural gas industries. API 6A valves are designed for the demanding environments of onshore and offshore drilling; production, pressure, and temperature extremes; of heavy oil, sour, and subsea applications, including hydraulic fracturing operations incorporating pressure ratings exceeding 10,000 pounds per square inch ("psi").

Large bore gate valves ("LBGVs") are one of the most popular components used in hydraulic fracturing operations, but one skilled in the arts would appreciate other similar applications obvious from these teachings. During such utilization, the LBGVs must be greased regularly as a part of routine maintenance procedures to protect components from excessive/premature wear due to employed abrasives, extreme temperatures, and high-pressures commonly found in the environment. The targeted LBGVs, (referred to as "frac-valves" herein for distinction), that are employed in typical hydraulic fracturing operations ("frac-ops"), in accordance with industry best practices and manufacturer recommendations, may require body cavity lubrication as often as every 10 cycles, and may require 20 lbs. or more of grease for each of those lubrication procedures.

Lubricant or Grease is pumped, under high pressure, primarily into the frac-valve's body cavity to reduce fluid turbulence through the valve and guard seals from eroding under flow of abrasive fluids. Methods of accomplishing lubrication are: 1) Connecting a grease gun assembly to a frac-valve body's grease fitting and manually pumping lubricant into the body cavity. 2) Connecting a supply line from a high-pressure lubricant source to a valved grease fitting on a frac-valve, and manually operating the valved grease fitting to allow lubricant to flow into the frac-valve's body cavity. 3) Connecting a supply line from a pump supplied lubricant source to a grease fitting on a frac-valve, and manually operating the pump to force lubricant to flow into the frac-valve's body cavity.

Manifolds are commonly found in industrial well operations where they may be used to aggregate output lines from multiple pump trucks to produce sufficient pressure to accomplish the desired results on a well site, as described above. A typical frac-op utilizing only a single missile or manifold along with the accompanying entourage of sand kings, storage tanks, hydration and blender trucks, sand cans, pump trucks, etc. will require a conservative estimate of 50 frac-valves to interconnect. These frac-valves will cycle a minimum of once during every frac-op. This means that the typical fracturing job ("frac-job"), consisting of a minimum 20 frac-op cycles to complete a wellbore, will require more than (50 frac-valves×20 cycles)/10 cycles between lubrications×20 lbs. of grease each cycle. This is literally more than a ton of grease used for maintenance of the frac-valves.

Valve manufacturers prescribe lubrication based on equipment cycles, with a maximum time limit to be observed regardless of actual use. A centralized lubrication system may be able to provide grease to thrust bearings of a manufacturing facility conveyor belt regularly (e.g., daily), but as described above, body cavity lubrication of typical LBGVs cannot be handled effectively by current centralized lubrication systems. Additionally, it is worth noting that many LBGVs require specific positioning of operational components before beginning lubrication followed by additional positioning requirements during and/or following application of measured quantities of lubricant to ensure proper distribution.

Attempts at creating centralized lubrications systems in O&G involve utilization of manifolds to disperse lubrication from a central location to multiple valve fitting in a frac op, such as those described in U.S. Pat. Nos. 10,753,535 and 10,760,735, both titled "Lubrication Manifold."

But like the many other centralized lubrication systems employed for industrial applications and used on heavy-duty mobile equipment, their configurations are not suitable to the environments of O&G frac-ops or cannot handle the exceptionally quantities of high-pressure lubricants required for maintenance with minimized impact on existing operations. The descriptions in the patents cited above attempt to scale up centralized lubrication by drawing from a lubricant reservoir with pumps to feed a single injection point, the manifold input. But those systems fail to accurately meter the lubricant dispersal in a way that ensures proper applications with minimal waste, along with having other deficiencies Those systems independently control multiple on/off valves on the outports of their lubrication manifold to deliver the lubrication to the frac-valves by metering the lubrication entering the input port of the manifold. The drawback is that the fluid-flow in multiple lines of the manifold is dependent on the manifold configuration. This means opening too many lines simultaneously results in pressure drops and insufficient lubrication of valves. Increased system pressure results in wasted lubricant due to higher flow rates when less lines are utilized. A system could employ metering at each output, but doing that would greatly complicate the system, both in the wiring, and setup. It would also increase initial cost and maintenance expenses of such a system due to the additional metering equipment needed in the implementation.

Previous maintenance activities during hydraulic fracturing required workers to manually connect a grease port of a frac-valve to a high-pressure grease source, then to pump a specific quantity of lubricant to the frac-valve, and depending on manufacture recommendations, to actuate the frac-valve in a prescribe sequence to properly distribute the lubrication throughout the components of the LBGV.

To avoid worker presence around the high-pressure lines serviced by the many LBGVs employed on a typical frac-job, the cited patents above utilize a source of high-pressure lubricant connected to an input of a manifold having a plurality of outputs with on/off valves that can be connected to each frac-valve. The system then allows a worker to remotely turn on and off output valves.

The operation method being taught in the above patents continue to have several of the disadvantages previously referenced. For example, the implementation of the teachings referenced above results in variations of fluid distribution and flow pressures as the outputs of the manifold are adjusted. The changes will cause some frac-valves to receive insufficient lubricant while others are over lubricated. This results in excessive maintenance on improperly lubricated LBGVs while over lubrication of others waste expensive resources. The fixes required for the single-meter manifold teachings result in either increased cost and maintenance of incorporating additional metering equipment; or implementation of complex mathematical modeling for on-the-fly adjustment of valve operation timing in compensation for flow variations experienced.

The modeling would also increase cost by requiring computing power to automate the system, since the modeling of a manifold with more than two or three outputs is too complex, with any amount of precision, to be figured in real-time by manual means. A theoretical model of a dividing manifold based on the Bernoulli equation, with frictional losses described using the Darcy-Weisbach equation results in a governing equation of dividing flow as follows:

$$P + \frac{\rho f}{2D} W^2 X + \frac{\rho}{2} W^2 = 0$$

$W$ is the velocity, $P$ is the pressure, $\rho$ is the density $D$ is the hydraulic diameter, $f$ is the frictional coefficient, $X$ is the axial coordinate in the manifold.

DETAILED DESCRIPTION OF THE PREFERRED EMBODIMENTS

Figure 1:
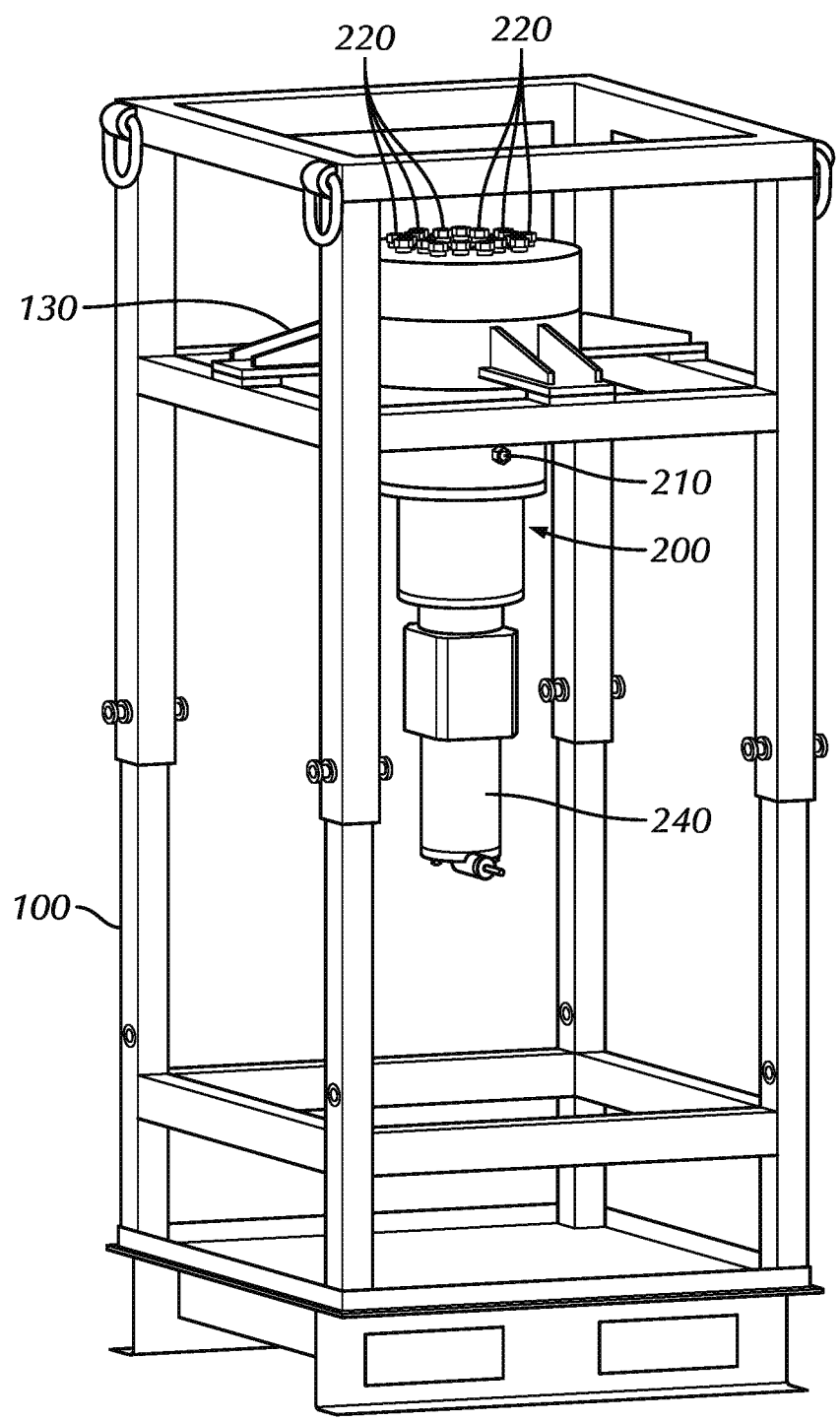
FIG. 1 is an illustration of a skid mounted high-pressure rotary manifold in accordance with an exemplary embodiment of the invention.

The rotary manifold is presented below in the inventor's preferred embodiment of utilization which is in O&G fracturing operations on a well site as a disbursement manifold for routing grease to frac-valves for lubrication maintenance. The rotary manifold in this embodiment is configured for remote operation and its actuator is explosion proofed (i.e., ignition source shielded) for positioning within exclusion zones (e.g., safety zone, classified zone, etc.) to limit the needs of worker presence within or near the hazardous environments.

The innovation comprises a rotary manifold with a mechanical rotary selector mechanism (a rotary valve plate), which rotates within the manifold body to place the manifold's input port in fluid communication with one of multiple output ports, to the exclusion of any others, thus ensuring the flow of lubrication into the input port is equal to the flow of lubrication out of the output port. A meter anywhere in the flow line can accurately measure the lubrication flow resulting in precise quantities being delivered to each individual valve. This embodiment has elected to meter the lubricant flow into the input port at the source, the pumping unit, and remote controls the rotary manifold.

A sub-system comprising a lubricant reservoir, and a high-pressure pump (a pumping unit) can supply grease, through individual metered lines to the inputs of multiple rotary manifolds. Metering of the lubricant feeds from the pumping unit and remote control of the rotary manifolds allows precise and proper maintenance of valves connected to the rotary manifold outputs. Additionally, the application of lubrication can be timed with the regular frac-valve positioning require by operations of the fluid control system thus preventing interruptions for maintenance purposes.

While a meter can be placed anywhere on the system, it is preferably located between the lubrication pumping unit's output and the rotary manifold's input so only a single metering device is required for the multiple devices serviced by a single manifold's outputs. Locating metering equipment close to the pumping unit makes the device easy to calibrate to the characteristics of the fluid being supplied. This also allows quick adjustments to compensate for different viscosities, pressures, temperatures, etc. that the pumps deliver to the final frac-valve.

The rotary manifold is mounted on a skid for easy site positioning. With explosion proofed actuator to position the rotary valve plate, a rotary manifold can be situated near Christmas trees or missiles during frac-ops, limiting the length of the multiple high-pressure hoses required to connect to each frac-valve being serviced. In an alternative embodiment, the rotary manifold can be paired with the lubricant supply on an inclusive skid. One skilled in the art can appreciate other options to accommodate intended applications.

The lubricant supply, comprised of a pumping unit and reservoir for the lubricants, may be situated either inside or outside of the exclusion zone, provided the pumping system is shielded or explosion proof. If not, longer hose runs between the pumping unit and the rotary manifold can use higher line pressures or larger diameter hoses to compensate for any flow friction to maintain flow rates. Placement of the lubricant supply involves weighing the lubricant reservoir's volume (i.e., the need for replenishments) against the possibility of pump and/or supply line failures, and the risks of other environmental issues (e.g., explosive and/or toxic gas presence, contamination/spillage, tripping hazards or other accessibility issues affecting worker safety.

In the preferred embodiment, the rotary manifold's skid has a box-like structure enclosing and protecting the rotary manifold, with telescoping vertical supports to allow shipping in a compressed configuration. The rotary manifold is generally cylindrically shaped and has a three-part body. Upper and lower body sections mate with the top and bottom of a ring-shaped middle section to create an accessible central cavity. The middle section has extensions for mounting support that project outward on four sides to mate with crossbars on the skid.

One skilled in the arts would appreciate that the body may be comprised of only two body halves, or a single hollow "bucket like" body having a cap or bottom plate (depending on orientation) to enclose the accessible central cavity. That is to say, the specific physical construction of the rotary manifold's body is not a limitation of the innovation. The innovation's rotary manifold body needs a central cavity to house the selector and contain fluids. The centralized cavity should complement the required operation of the selector mechanism and would ideally be accessible for construction/maintenance of internal components.

The skid supports the three-part body such that the output ports are oriented upward, and the actuator hangs down underneath the valve body, connected to the central rotary shaft of the mechanical selector so the shaft extends upward in a vertical orientation. The actuator is a shielded stepper motor coupled to the manifold's mechanical rotary selector.

The selector is comprised of a centrally located rotary shaft, extending vertically through the manifold body, and therein is coupled through the center of a disk-shaped rotary valve plate. The rotary shaft extending through the top and bottom sections of manifold body is mated thereto by appropriate seals and/or bearings such that the rotary shaft with the rotary valve plate located within can be rotated freely within the manifold body by the actuator.

The rotary valve plate is generally disk shaped and is comprised of a valve seat on one face, at a first specific distance from the center of the rotary shaft. The valve plate is adjacent to the top section of the manifold body such that the rotating valve plate positions the valve seat in fluid connection with one of multiple output ports oriented in a radial pattern and extending to the external surface of the manifold body. The rotary valve plate may have another, or more, valve seat(s) positioned at different distances from the central rotary shaft and mating with a series of other output ports oriented in different radial patterns. The radial patterns of the output ports are offset such that only one valve seat is placed in fluid communication with an output port. The multiple radial distances allowing an increase in the quantity of output ports without structurally compromising the manifold body.

An input port extends through the manifold body to an annular around the centrally located rotary shaft. The rotary shaft has a hollow core which fluidly connects the annular with horizontal flow path(s) extending therefrom, through the rotary valve plate to the valve seat(s), and to the selected output port. Thus, by positioning the rotary selector plate, the input port is placed in fluid communication with a selected output port, excluding all others.

An intermediate position may act to close off flow through the rotary manifold by not aligning to any output port, or an output port may be capped off or connected to a valve which serves the same purpose. One skilled in the arts would appreciate that an output from a rotary manifold may be connected to the input of another manifold to increase the number of output ports available.

In the preferred method of use, LBGVs or other types of frac-valves are outfitted with sensor(s) to detect movements and determine their gate position. Optionally, automated frac-valves would be preferable since it would be possible to determine required data by similar sensors incorporated into most automation control systems. Alternatively, automated frac-valves may provide the desired data through other means such as commanding an action and monitoring other system indicators, such as downstream flow meters to confirm anticipated responses to the directed action.

In one embodiment, sensors providing movement and position data are incorporated into manually operated frac-valves. In another embodiment, actuators with sensing capability are incorporated for actuating a frac-valve and actuators are configured to share movement and position data received with a centralized lubrication system. In another embodiment frac-valve sensors provide data simultaneously to an actuator and to a centralized lubrication system. In another embodiment frac-valve sensors are configured to provide movement data to a centralized lubrication system prior to commanding the frac-valve's movement.

A logic controller, or other computing device with storage and counting as well as the logic abilities currently existing in centralized lubrication systems, may be configured to monitor frac-valve operations to determine lubrication requirements. Additionally, lubrication delivery can be coordinated with existing frac-valve operations, preventing needless cycling for the sole purpose of lubrication, and eliminating downtime for preventative maintenance activities.

While electrically controlled actuators and sensors are preferred, one skilled in the arts would appreciate that other power sources are also applicable to the innovation described here. Due to the proliferation of electronic actuators, signals, and electricity's predominance in the area of controls, further discussion will be limited thereto.

Logic controllers of local lubrication systems may directly communicate with logic controllers of actuated frac-valves directly through any electronic means acceptable to the application or may limit communication to information relayed through the frac-valve's actions. Ignoring control, ownership, responsibility, maintenance, and other issues; a plurality of logic controllers could be eliminated by consolidation of all frac-valve actuation and lubrication distribution for a missile, a manifold, a Christmas tree, or a pump jack, treatment, and collection operation into a single controller.

Integration of the control systems allows data coordination. Between the sensors, actuator operations, response time, torque requirements, resistance, timing, etc. there is a lot that can be deduced about the condition of a frac-valve. Those determinations may justify altering preventative maintenance procedures. Comparisons across time may allow predictive maintenance. For example, torque profiles and trends could show frac-valve seating issues, bearing wear, etc.

DETAILED DESCRIPTION OF THE DRAWINGS

FIG. 1 is an illustration of a skid mounted high-pressure rotary manifold in accordance with an exemplary embodiment of the invention. The skid (100) shown has telescopic verticals, and cross bars. The cross bars support the rotary manifold (200) via the manifold's mounts (130) extending from the manifold body (250, not indicated).

The manifold (200) has a plurality of output ports (220) that are individually placed in fluid communication with an input port (210) by positioning an internal rotary selector via the actuator (240).

Figure 2:
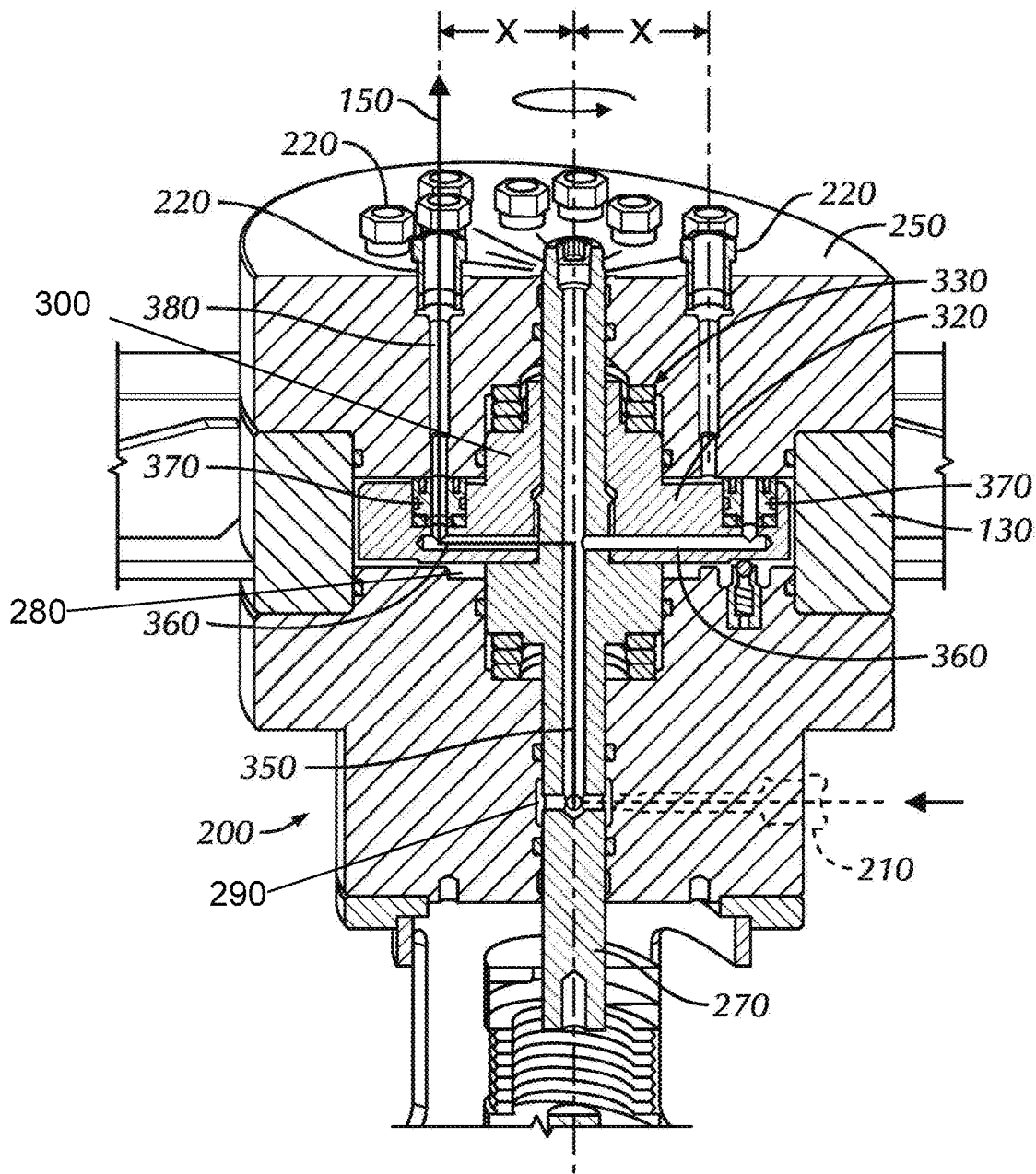
FIG. 2 shows a first cross-section of a rotary manifold in accordance with an exemplary embodiment of the invention.
Figure 3:
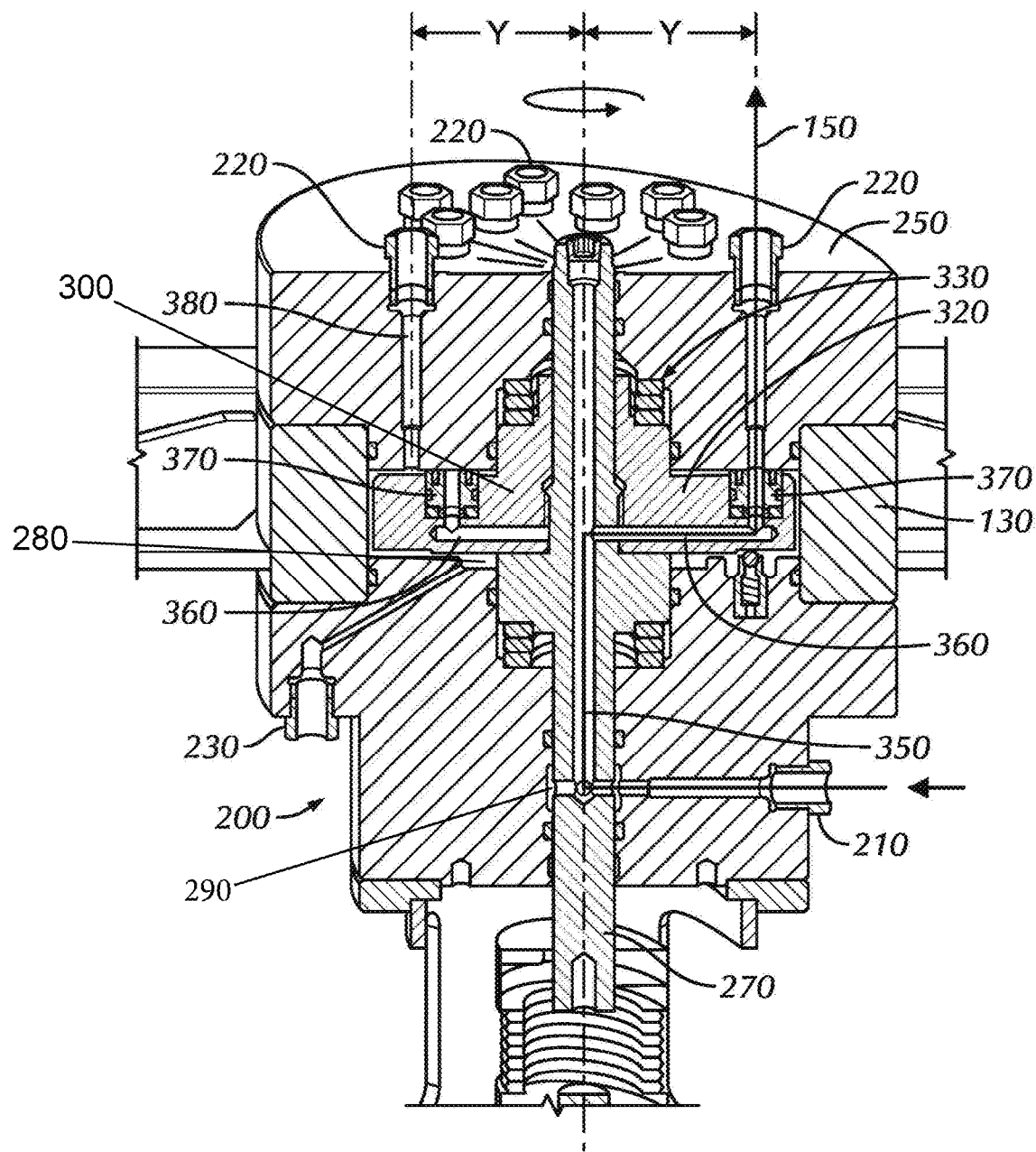
FIG. 3 shows a second cross-section of the same rotary manifold (advanced from FIG. 2 approximately $\frac{1}{16}^{th}$ of a revolution about the central vertical axis), in accordance with an exemplary embodiment of the invention.

FIG. 2 shows a first cross-section of a rotary manifold in accordance with an exemplary embodiment of the invention. FIG. 3 shows a second cross-section of the same rotary manifold (advanced from FIG. 2 approximately $1/16^{th}$ of a revolution about the central vertical axis), in accordance with an exemplary embodiment of the invention. The rotary manifold illustrated has 16 output ports which are divided in two groups positioned in circular rings, patterned so neighboring output ports alternate between a first distance (X) and a second distance (Y) to prevent structurally compromising the manifold body (250).

The rotary manifold (200) has a central ring with extending mounting arms (130), enclosed between an upper and lower section to form a central cavity (280). The central axle (270) of the rotary selector (300) is held, but rotationally movable due to bearings and/or seals (330). The upper section (250) has output ports (220) extending through and mating to a valve seat (370) on the rotary valve plate (320). The rotary valve plate (320) has two horizontal flow paths (360) extending outward form the center to the bottom of the valve seats (370). The left flow path extending to a first distance (X) and the right flow path extending to a different second distance (Y).

The cross section shown in FIG. 2 passes through two opposing output ports positioned at the first distance (X), so the left valve seat (370), at X distance from the center, mates with the output port (220), but the right valve seat (370), at Y distance from the center, is blocked against the underside of the manifold body's top section blocking fluid flow. This places only the single selected output port (220) aligned with the left valve seat (370) in fluid communication with the input port (210) allowing fluid to enter and pass to the annulus (290) around the axle (270), flow up the hollow core (350) of the axle (270), to reach the radial paths (360) of the rotary valve plate (320), and only through the left valve seat (370) to exit (380) via the selected output port (220) being delivered (150) to the targeted device (not shown).

Advancing the actuator (240, not visible) an increment, here 1/16 of a revolution, selects a different output port. The cross section shown in FIG. 3 passes through two opposing output ports positioned at the second distance (Y), so the right valve seat (370) mates with the output port (220), but the left valve seat (370) is blocked against the underside of the manifold body's top section. This places only the single selected output port (220) aligned with the right valve seat (370) in fluid communication with the input port (210) allowing fluid to enter and pass to the annulus (290) around the axle (270), flow up the hollow core (350) of the axle (270), to reach the radial paths (360) of the rotary valve plate (320), and only through the right valve seat (370) to exit (380) via the selected output port (220) being delivered (150) to the targeted device (not shown).

Figure 4:
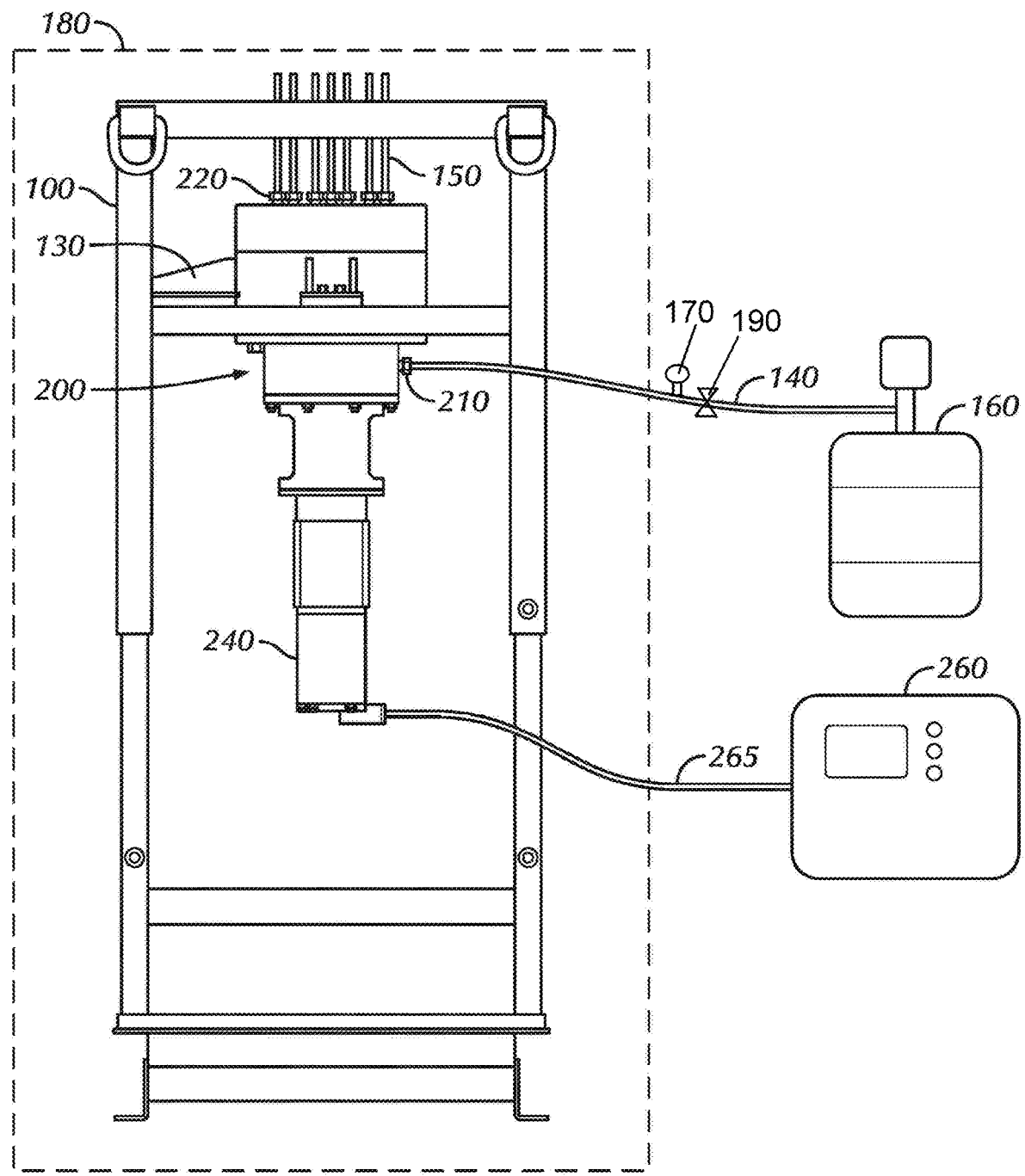
FIG. 4 illustrates an exemplary skid mounted high-pressure rotary manifold system configured for operational safety through implementation of exclusion zones in accordance with an exemplary embodiment of the invention.

FIG. 4 illustrates an exemplary skid mounted high-pressure rotary manifold system configured for operational safety through implementation of exclusion zones in accordance with an exemplary embodiment of the invention. This embodiment of the skid (100) is configured for an exclusion zone (180). The manifold (200) supported by the mounts (130) on the skid (100) positioned within the exclusion zone (180), closer to where high-pressure lubricant is to be delivered (150). The actuator (240) is explosion proof and wired (265) to a remote logic controller (260) located outside of the exclusion zone (180). There is a fluid supply (160), also located outside the exclusion zone (180), connected by a lubricant supply line (140) to the manifold's (200) input port (210). There is a meter (170) and a control valve (190) in supply line (140).

Figure 5:
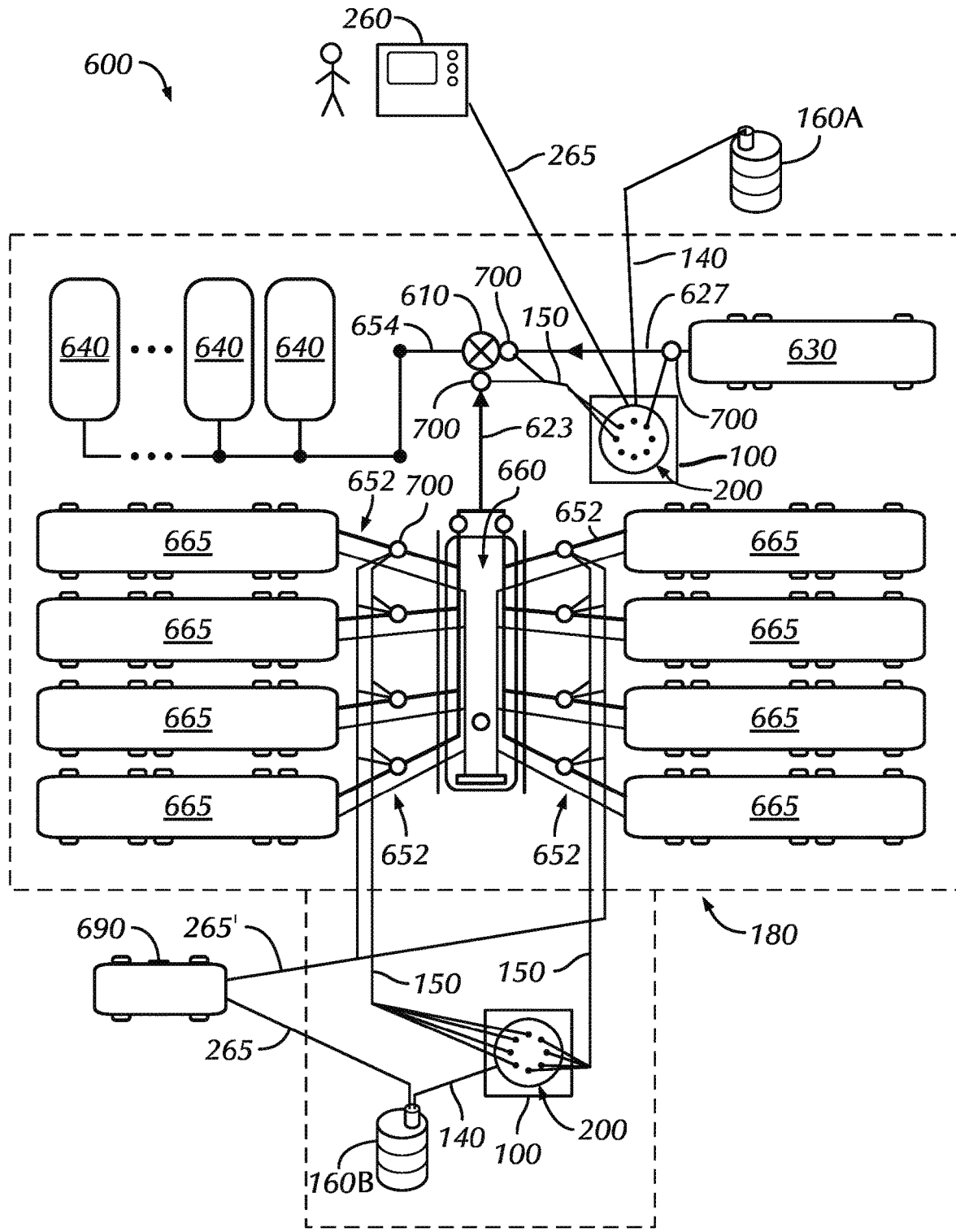
FIG. 5 shows an exemplary high-pressure rotary manifold system layout, with an exclusion zone for operational safety of drilling sites during fracturing operations of an oil & gas well in accordance with an exemplary embodiment of the invention.

FIG. 5 shows an exemplary high-pressure rotary manifold system layout, with an exclusion zone for operational safety of drilling sites during fracturing operations of an oil & gas well in accordance with an exemplary embodiment of the invention. Fracking fluid is mixed and sent by equipment not shown on the fracking equipment layout (600) illustrated here The fracking fluid is distributed by the missile (660) through several fluid lines (652) to the pump trucks (665) before injection (623) at high pressure into the wellbore (610). Back pressure trucks (630) maintain back pressure (627) in the wellbore (610) until the spent fluids (654) are released into the flowback tanks (640). After which the cycle begins again.

To service the many frac-valves (700) required, a manifold (200) mounted on a skid (100) is positioned within the exclusion zone (180) to facilitate connection of its output ports (150) to the frac-valves (700) to be maintained. The manifolds (200) are supplied lubricant through high pressure lubricant supply lines (140) fed from pumping units (160A & B) which may be located inside the exclusion zone (180), if they are explosion proofed (160B), or outside if they are not (160A).

The fluid distribution system components are wired (265) for remote control (260) by workers, or by automation synchronized with other operations (690) possible through automated frac-valves (700) having sensors and actuators to providing data (265').

Figure 6:
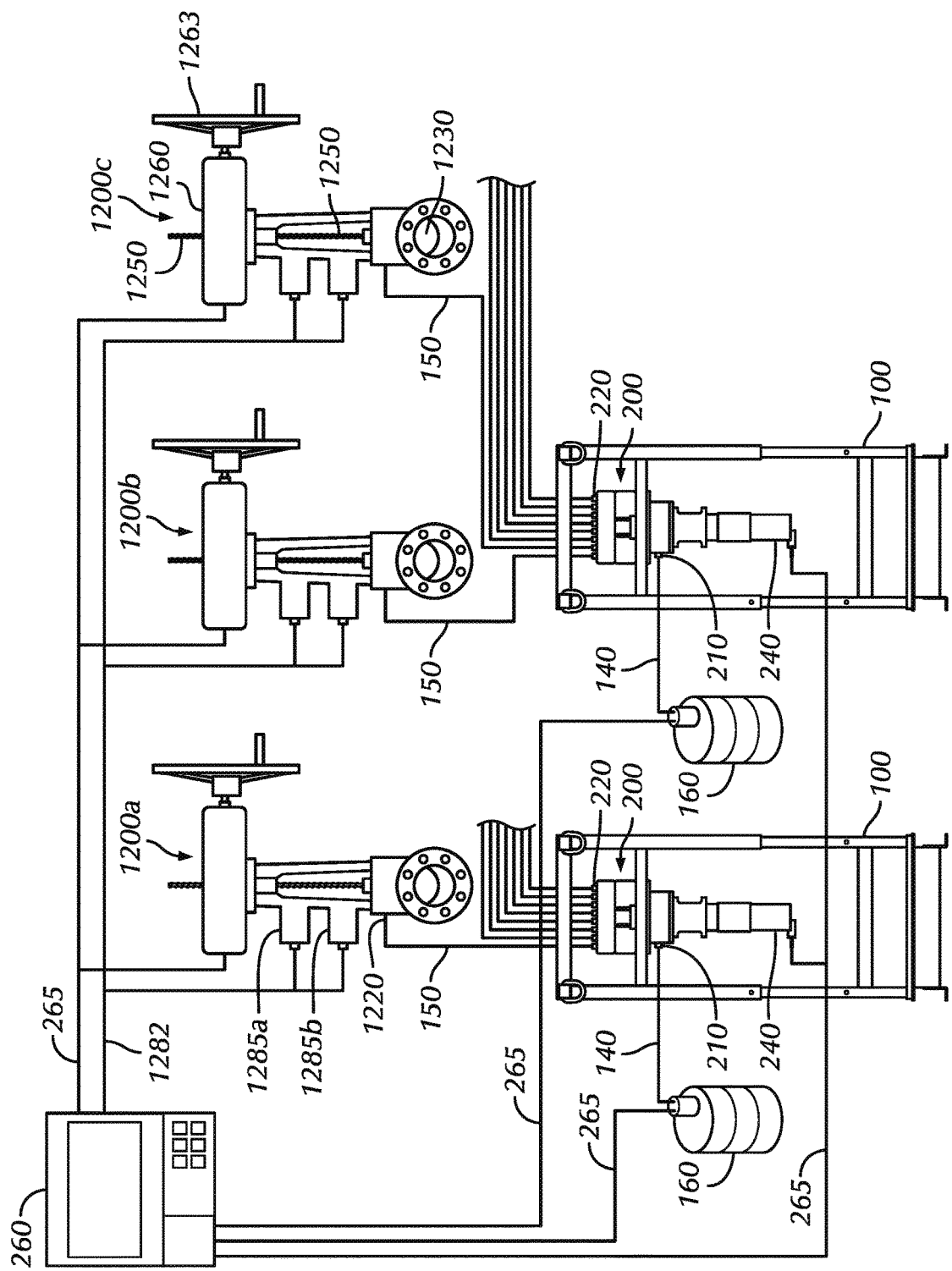
FIG. 6 shows an exemplary configuration for pump and valve monitoring and use of high-pressure rotary manifolds in accordance with an exemplary embodiment of the invention.

FIG. 6 shows an exemplary configuration for pump and valve monitoring and use of high-pressure rotary manifolds in accordance with an exemplary embodiment of the invention. The LBGVs (1200) have hand actuators (1263) and powered actuators (1260) connected to the controller's (260) output or control signals (265). The valve's (1200) stems (1250) have position sensors (1285) connected to the controller's (260) inputs (1282) which can sense movements of the valve's (1200) gate (1230). This allows the logic controller (260) to monitoring the sensors (1285) to verify commands sent to the actuators (1263), and to detect manual movement by the hand actuator (1263).

The logic controller (260) also connects (265) to the lubrication control system components: the pumping unit (160) and the rotary actuator (240). Which allows the logic controller to count strokes of each valve (1200) and synchronize maintenance by waiting for a required operation on a particular valve.

As an example, assume the left most valve (1200a) has performed 9 of the 10 cycles recommend as maximum by the manufacture, so it is due for maintenance lubrication. Knowing the grease fitting (1220) of the valve (1200a) is connected to a specific delivery line (150) from the (left) rotary manifold (200), the logic controller can signal the rotary actuator to select the specific output port (220) for the delivery line (150), then activate the pumping unit (160) when it next needs to signal the actuator (1260) on that valve (1200a). The controller (260) can then meter in the correct amount of lubricant before, during, or after repositioning the valve (1200a) in accordance with the sensor (1285) monitoring to the exact specifications of the manufacturer, even if each valve has different application procedures and lubrication requirements.

The diagrams, in accordance with exemplary embodiments of the present innovation, are presented as examples and should not be construed to limit other embodiments within the scope of the innovation. For instance, heights, widths, and thicknesses may not be to scale and should not be construed to limit the innovation to the particular proportions illustrated. Additionally, some elements illustrated in the singularity may actually be implemented in a plurality, and some element illustrated in the plurality could actually vary in count. Further, some elements illustrated in one form could actually vary in detail. Specific numerical data values (such as specific quantities, numbers, categories, etc.) or other specific information should be interpreted as illustrative for discussing exemplary embodiments and is not provided to limit the innovation.

The above discussion is meant to be illustrative of the principles and various embodiments of the present innovation. Numerous variations and modifications will become apparent to those skilled in the art once the above disclosure is fully appreciated. It is intended that the following claims be interpreted to embrace all such variations and modifications.

What is claimed:

1. A rotary manifold comprising:
   a body with a central cavity;
   a plurality of output ports extending through the body to be in fluid communication with the central cavity;
   an input port extending through the body to be in fluid communication with the central cavity; and
   a rotary selector comprising:
      an axle passing centrally through the body central cavity;
      a rotary valve plate mounted to the axle and being rotatable within the central cavity;
   wherein the rotary selector is positionable to place a selected output port in fluid communication with the input port;
   wherein the plurality of output ports are divided into two or more groups;
   wherein each group is circumferentially arranged at an equal radial distance from the central axis of the axle;
   the rotary valve plate has a fluid path comprising two or more radial sections outwardly extending perpendicular to the central axis of the axle to mate to respective ones of the output ports in one of the groups.

2. The rotary manifold as described in claim 1 wherein the rotary valve plate is rotationally positioned by an actuator.

3. The rotary manifold as described in claim 2 wherein the actuator is ignition source shielded.

4. The rotary manifold as described in claim 2 wherein the actuator is shielded against igniting an explosion.

5. The rotary manifold as described in claim 2 wherein the actuator is operable by a logic controller.

6. The rotary manifold as described in claim 1 wherein the manifold is skid mounted.

7. The rotary manifold as described in claim 6 wherein the skid telescopically compresses.

8. A multi-valve lubrication system comprising:
   a lubrication pumping unit comprising:
      a fluid supply; and
      a pump;
   a rotary manifold comprising:
      a body with a central cavity;

a plurality of output ports extending through the body to be in fluid communication with the central cavity;
an input port extending through the body to be in fluid communication with the central cavity; and
a rotary selector comprising:
an axle extending through the body walls and passing centrally through the body central cavity:
a rotary valve plate mounted to the axle and being rotatable within the central cavity:
wherein the rotary selector is positionable to place a selected output port in fluid communication with the input port;
an actuator, joined to the axle of the rotary manifold, wherein the actuator radially positions the rotary valve plate to place a selected output port in fluid connectivity with the input port;
the lubrication pumping unit fluidly connected through a lubricant supply line having a meter and a control valve to the rotary manifold's input port.

9. The lubrication system as described in claim 8 further comprising a logic controller, wherein the logic controller:
controls the actuator of the rotary manifold to selectively place the input port in fluid communication with an output port;
controls the lubrication pumping unit to draw lubricant from the fluid supply;
monitors the meter of the lubricant supply line; and
controls the control valve of the lubricant supply line,
to deliver a selected quantity of lubricant out a selected output port of the rotary manifold.

10. The lubrication system as described in claim 9 wherein:
an output port of the rotary manifold is connected to a grease fitting of a frac-valve further comprising:
position sensors; and/or
a frac-valve actuator;
one or more of which is in communication with the logic controller;
wherein the logic controller monitors the position sensors of the frac-valve, or controls the actuator of the frac-valve; and
synchronizes delivering of lubricant to the frac-valve with sensed or directed valve operation.

11. A rotary manifold comprising:
a body with a central cavity;
a plurality of output ports extending through the body to be in fluid communication with the central cavity;
an input port extending through the body to be in fluid communication with the central cavity; and
a rotary selector comprising:
an axle extending through the body walls and passing centrally through the body central cavity;
a rotary valve plate mounted to the axle and being rotatable within the central cavity;
wherein the rotary selector is positionable to place a selected output port in fluid communication with the input port;
wherein the rotary valve plate is rotationally positioned by an actuator, the actuator being ignition source shielded.

12. A rotary manifold comprising:
a body with a central cavity;
a plurality of output ports extending through the body to be in fluid communication with the central cavity;
an input port extending through the body to be in fluid communication with the central cavity; and
a rotary selector comprising:
an axle extending through the body walls and passing centrally through the body central cavity;
a rotary valve plate mounted to the axle and being rotatable within the central cavity;
wherein the rotary selector is positionable to place a selected output port in fluid communication with the input port;
wherein the manifold is mounted on a telescopically compressible skid.

* * * * *